(12) United States Patent
Dabral et al.

(10) Patent No.: US 7,444,442 B2
(45) Date of Patent: Oct. 28, 2008

(54) DATA PACKING IN A 32-BIT DMA ARCHITECTURE

(76) Inventors: Shashank Dabral, Flat No. 601, Kalyan Apartments, Sector-24, Indira Nagar, Lucknow, Uttar Pradesh (IN) 226016; Ramanujan K Valmiki, Villa No. 23-1, Adarsh Palm Meadows, Airport Varthur-Whitefield Road, Ramagundahalli, Bangalore, Karnataka (IN) 560066

( * ) Notice: Subject to any disclaimer, the term of this patent is extended or adjusted under 35 U.S.C. 154(b) by 193 days.

(21) Appl. No.: 11/483,018

(22) Filed: Jul. 7, 2006

(65) Prior Publication Data

US 2007/0162644 A1    Jul. 12, 2007

(30) Foreign Application Priority Data

Dec. 13, 2005   (IN) .................. 1821/CHE/2005

(51) Int. Cl.
*G06F 13/28*   (2006.01)
*G06F 13/00*   (2006.01)

(52) U.S. Cl. .................. 710/22; 710/33; 710/65; 710/308

(58) Field of Classification Search ............ 710/22–35, 710/65–68, 305–308
See application file for complete search history.

(56) References Cited

U.S. PATENT DOCUMENTS 5,436,892 A    7/1995   Tago et al.
5,608,889 A *  3/1997   Werlinger et al. .......... 711/217
5,983,301 A * 11/1999   Baker et al. ................ 710/113
6,742,063 B1   5/2004   Hellum et al.
6,816,921 B2 * 11/2004  Jahnke et al. ................ 710/22
6,954,818 B2 * 10/2005  Kent .......................... 710/306
2004/0255072 A1 12/2004 Kiris
2005/0036516 A1  2/2005 Cheung et al.
2006/0294447 A1 * 12/2006 Mackey ...................... 714/752

* cited by examiner

*Primary Examiner*—Christopher B Shin
(74) *Attorney, Agent, or Firm*—Ash Tankha

(57) ABSTRACT

A method of reducing data transfer overheads in a 32-bit bus interface unit direct memory access architecture. The method comprises the steps of identifying the optimal number of data elements, that can be accessed as a single full-word transfer, setting data packing criteria and analysing the data pattern and determining the impact of offset direction on data packing. If the packing criteria are met, the data is compacted and fetched in four bytes or two half-words in one transaction by performing a full-word transfer instead of a partial transfer. If the packing criteria are not met, a single byte or a single half word is fetched. This invention provides a system for reducing data transfer overheads. The system comprises of an external address generation unit for generating external memory addresses and corresponding byte enables and a read local address generation unit for generating internal memory addresses and corresponding byte enables.

4 Claims, 19 Drawing Sheets

401

| TRANSFER NUMBER | ADDRESS | DATA COUNT |
|---|---|---|
| 1 | 0x106 | 1 |
| 2 | 0x107 | 1 |
| 3 | 0x108 | 4 |
| 4 | 0x10C | 4 |
| 5 | 0x110 | 4 |
| 6 | 0x114 | 4 |
| 7 | 0x118 | 4 |
| 8 | 0x11C | 4 |
| 9 | 0x120 | 4 |
| 10 | 0x124 | 4 |
| 11 | 0x128 | 4 |
| 12 | 0x12C | 4 |
| 13 | 0x130 | 1 |
| 14 | 0x131 | 1 |

SEQUENTIAL ADDRESS

| TRANSFER TYPE | BE PATTERN | PACKED ACCESS |
|---|---|---|
| BYTES | 0001 | NO |
| | 0010 | NO |
| | 0100 | NO |
| | 1000 | NO |
| | 1111 | YES |
| HALF-WORDS | 0011 | NO |
| | 1100 | NO |
| | 1111 | YES |
| FULL-WORDS | 1111 | NA |

FIGURE 5

SOURCE ACCESS

|   | 3   | 2   | 1   | 0   |
|---|-----|-----|-----|-----|
|   | A2  | A1  | A0  |     |
|   | A3 3| A3 2| A3 1| A3 0|
|   | A4 3| A4 2| A5 1| A5 0|
|   |     |     | A7  | A6  |

601

DESTINATION ACCESS

602

|   | 3   | 2   | 1   | 0   |     |
|---|-----|-----|-----|-----|-----|
|   | A1  | A0  |     |     |     |
|   | A3 2| A3 1| A3 0| A2  | ◀ PACKED ACCESS |
|   | A4 2| A4 1| A4 0| A4 3| ◀ PACKED ACCESS |
|   | A5 2| A5 1| A5 0| A4 3| ◀ PACKED ACCESS |
|   |     | A7  | A6  | A5 3|     |

CONTROL FLOW FOR INTERNAL ACCESS

603

| TRANSFER NUMBER | EXTERNAL DATA ELEMENT(S) | BYTE ENABLE |
|---|---|---|
| 1 | A0 | 0100 |
| 2 | A1 | 1000 |
| 3 | A2, A3 0, A3 1, A3 2 | 1111 |
| 4 | A3 3, A4 0, A4 1, A4 2 | 1111 |
| 5 | A4 3, A5 0, A5 1, A5 2 | 1111 |
| 6 | A5 3 | 0001 |
| 7 | A6 | 0010 |
| 8 | A7 | 0100 |

| TRANSFER TYPE | A [1:0] | TRANSFER SIZE | EXTERNAL OFFSET | CRITERIA MET | BE PATTERN |
|---|---|---|---|---|---|
| BYTES | 00 | >4 | +1 | YES | 1111 |
|  | 00 | <4 | X | NO | 0001 |
|  | 00 | X | NOT (+1) | NO | 0001 |
|  | 01 | X | X | NO | 0010 |
|  | 10 | X | X | NO | 0100 |
|  | 11 | >4 | -1 | YES | 1111 |
|  | 11 | <4 | X | NO | 1000 |
|  | 11 | X | NOT (-1) | NO | 1000 |
| HALF - WORD | 0X | >2 | +2 | YES | 1111 |
|  | 0X | <2 | X | NO | 0011 |
|  | 0X | X | NOT (+2) | NO | 0011 |
|  | 1X | >2 | -2 | YES | 1111 |
|  | 1X | <2 | X | NO | 1100 |
|  | 1X | X | NOT (-2) | NO | 1100 |
| FULL - WORD | XX | X | X | NA | 1111 |

FIGURE 13

| TRANSFER TYPE | A[1:0] | TRANSFER SIZE | VALID BYTES / HW IN R1 AND R2 | EXTERNAL OFFSET | CRITERIA MET | BE PATTERN |
|---|---|---|---|---|---|---|
| BYTES | 00 | >4 | >=4 | +1 | YES | 1111 |
|  | 00 | <4 | X | X | NO | 0001 |
|  | 00 | X | <4 | X | NO | 0001 |
|  | 00 | X | X | NOT(+1) | NO | 0001 |
|  | 01 | X | X | X | NO | 0010 |
|  | 10 | X | X | X | NO | 0100 |
|  | 11 | >4 | >=4 | −1 | YES | 1111 |
|  | 11 | <4 | X | X | NO | 1000 |
|  | 11 | X | <4 | X | NO | 1000 |
|  | 11 | X | X | NOT(−1) | NO | 1000 |
| HALF - WORD | 0X | >2 | >=2 | +2 | YES | 1111 |
|  | 0X | <2 | X | X | NO | 0011 |
|  | 0X | X | <2 | X | NO | 0011 |
|  | 0X | X | X | NOT(+2) | NO | 0011 |
|  | 1X | >2 | >=2 | −2 | YES | 1111 |
|  | 1X | <2 | X | X | NO | 1100 |
|  | 1X | X | <2 | X | NO | 1100 |
|  | 1X | X | X | NOT(−2) | NO | 1100 |

| R1 | R2 |
|------|------|
| 0001 | 0001 |
| 0010 | 0010 |
| 0100 | 0100 |
| 1000 | 1000 |
| 1111 | 1111 |
|      | 1110 |
|      | 1100 |
|      |      |

1802

| R2_SUM | vb_0 | vb_1 | vb_2 | vb_3 |
|---|---|---|---|---|
|   |   |   |   |   |
| 4 | r2_0 | r2_1 | r2_2 | r2_3 |
| 3 | r2_1 | r2_2 | r2_3 | FIRST BYTE r1 |
| 2 | r2_2 | r2_3 | r2_0 | r2_1 |
| 1 | FIRST BYTE r2 | r1_0 | r1_1 | r1_2 |

SOURCE ACCESSES 2101a

| ACCESS | DATA |
|---|---|
| 1 | w0 |
| 2 | w1(0,1,2,3) |
| 3 | w2(0,1,2,3) |
| 4 | w3(0,1,2,3) |
| 5 | w4 |
| 6 | w5 |
| 7 | w6 |

DESTINATION ACCESSES 2101b

| ACCESS | DATA |
|---|---|
| 1 | D-w0 |
| 2 | D-w1 |
| 3 | D-w2 |
| 4 | D-w3 |
| | |
| | |
| | |

FIGURE 21

FIRST DESTINATION

FIRST_BYTE_R1_POSITION = 4

FIRST_BYTE_R2_POSITION = 3

R2_SUM = 1

R1_SUM = 4

FIRST_VALID_BYTE (vb_0) = FIRST_BYTE_R2 = POSITION 3 IN THE STAGE 1 REGISTER vb_1 = BYTE POSITION 4 vb_2 = BYTE POSITION 5 vb_3 = BYTE POSITION 6

SECOND DESTINATION

FIRST_BYTE_R1_POSITION = 4

FIRST_BYTE_R2_POSITION = 3

R2_SUM = 1

R1_SUM = 4

FIRST_VALID_BYTE (vb_0) = FIRST_BYTE_R2 = POSITION 3 IN THE STAGE 1 REGISTER vb_1 = BYTE POSITION 4 vb_2 = BYTE POSITION 5 vb_3 = BYTE POSITION 6

DATA PACKING IN A 32-BIT DMA ARCHITECTURE

FIELD OF THE INVENTION

This invention relates in general relates to data packing and particularly to data packing in a 32-bit DMA architecture.

BACKGROUND OF THE INVENTION

For byte or half-word transfers, a conventional direct memory access (DMA) unit requires a single access per transfer. Furthermore, certain implementations of Bus protocols, such as on-chip peripheral bus (OPB) and memory slaves do not allow burst transfers on non-word transfer types. This can affect the performance of direct random access memory (DRAM) type slaves that have a high latency for the first transfer, but then provide single cycle access for subsequent sequential transfers. For such an implementation, a conventional DMA architecture will be negatively impacted by the full latency of the DRAM slave for every access.

The present invention clubs together sequential byte or half-word transfers and accesses up-to 4 bytes or 2 half-words in one access by performing a full word transfer. This invention reduces the total accesses on the bus and also obtains single cycle access for a majority of the transfers by utilizing the advantage of the issuance of burst requests.

This invention discloses a novel method of handling byte and half-word data in a DMA architecture designed for a 32-bit Bus. The proposed method and architecture compacts data and fetches four bytes or two half-words in one transaction by performing a full-word transfer instead of a partial transfer, thus eliminating the input-output (IO) bottleneck which plague many DMA designs. Though the byte-enable support architecture described in this document is specific to certain DMA architecture, the novel method of this invention is applicable to any DMA architecture. Furthermore, throughout the design of the method and system design disclosure of this invention, special emphasis has been placed on achieving single cycle throughput while still maintaining a high operating frequency.

FIG. 1 is an example illustrating a memory access 101 of thirteen bytes starting from the address 0×107. For unpacked access 103, such as in a conventional DMA, the total number of accesses required to complete this set of transactions is thirteen, with each access requiring ten cycles. This requirement of ten cycles is specific to this example. The total number of cycles thus required is 130. In contrast, under this invention, for packed accesses 102 only 4 transfers are required on the bus. Furthermore, the last two transfers utilize the burst mode facility and each transfer is completed in a single cycle. Thus, the total number of cycles required under this invention is only 22, an order of magnitude less than that required by conventional methods.

SUMMARY OF THE INVENTION

A method of reducing data transfer overheads in a 32-bit bus interface unit direct memory access architecture. The method comprises the steps of identifying the optimal number of data elements, that can be accessed as a single full-word transfer, setting data packing criteria and analysing the data pattern and determining the impact of offset direction on data packing. If the packing criteria are met, the data is compacted and fetched in four bytes or two half-words in one transaction by performing a full-word transfer instead of a partial transfer. If the packing criteria are not met, a single byte or a single half word is fetched. This invention provides a system for reducing data transfer overheads. The system comprises of an external address generation unit for generating external memory addresses and corresponding byte enables and a read local address generation unit for generating internal memory addresses and corresponding byte enables.

BRIEF DESCRIPTION OF THE DRAWINGS

FIG. 4 illustrates the address movement per transfer when the data is fetched from the external memory in a packed fashion.

FIG. 5 illustrates valid byte enable patterns for both the internal and external sides.

FIG. 6 illustrates the transfer of data when both the addresses are not aligned to the same grid boundary.

FIG. 13 illustrates the byte-enable pattern generation logic.

FIG. 16 illustrates the byte enable pattern generation.

FIG. 21 illustrates the source and destination accesses of the example illustrated in FIG. 20.

DETAILED DESCRIPTION OF THE INVENTION

This invention provides a method of reducing data transfer overheads in a 32-bit bus interface unit direct memory access architecture. The optimal number of data elements are identified that can be accessed as a single full-word transfer. Criteria for data packing are established. The data pattern is analysed and the impact of offset direction on data packing is determined. The data is compacted and four bytes or two half-words in one transaction is fetched by a full-word transfer instead of a partial transfer if the packing criteria is met, and a single byte or a single half word is fetched if the packing criteria is not met.

Figure 2:
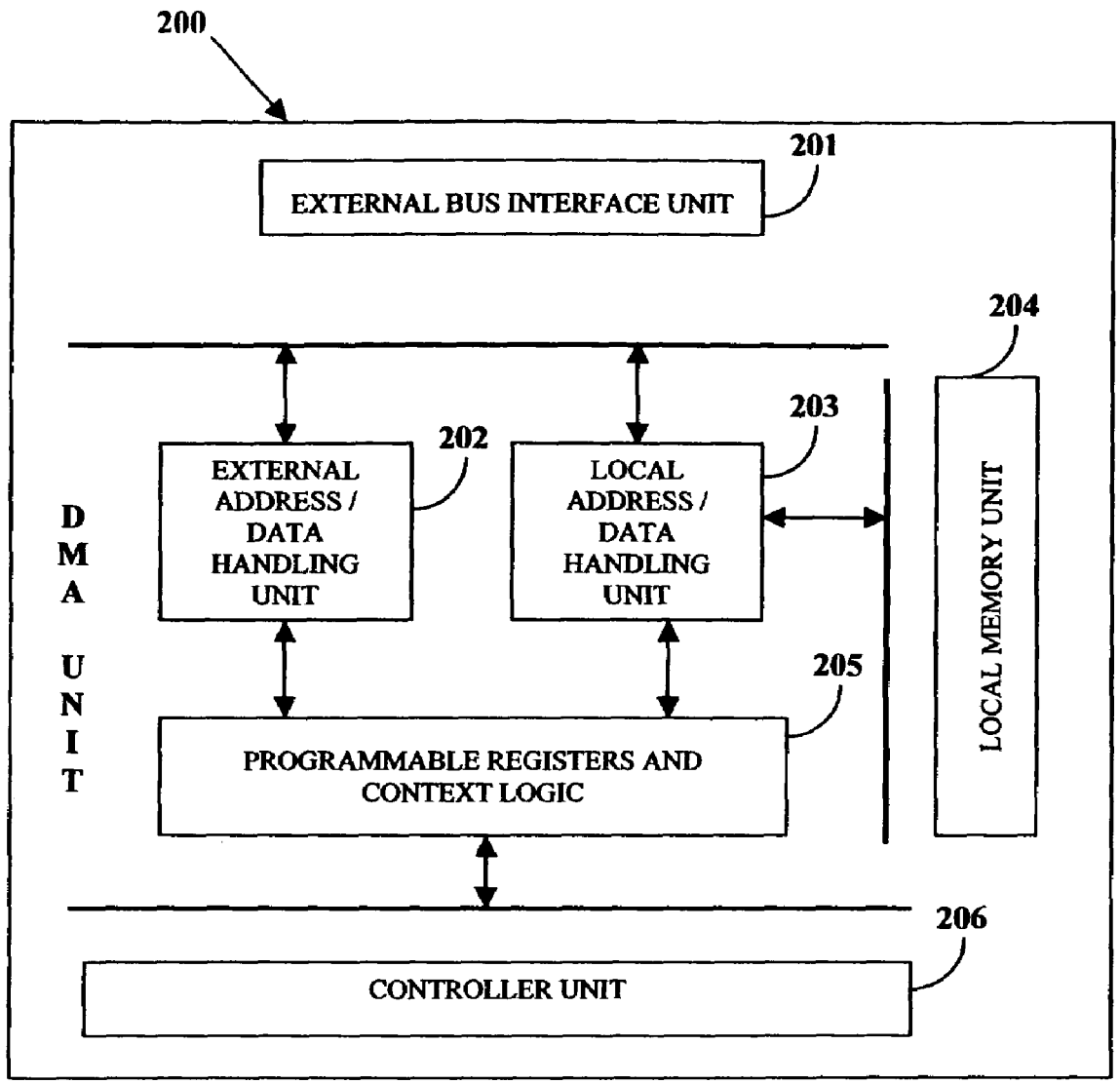
FIG. 2 illustrates the direct memory access (DMA), controller unit, local memory unit (LMU) and external bus interface unit.

FIG. 2 illustrates the direct memory access DMA 200 along with the controller unit 206, local memory unit 204 and external bus interface unit 201. The external bus interface unit 201 provides connectivity to different bus standards whereas the local memory unit 204 functions as the temporary storage in the architecture. The DMA 200 receives the programming parameters from the controller unit 206 and then performs a set of data transfers between the local memory 204 and the external bus 201. The controller unit 206 is responsible for programming the DMA 200, providing it with a start strobe to start data transfers and checking the DMA 200 status to detect the completion of the transfer of data.

The internal structure of the DMA 200 consists of a set of contexts logics, an external address and data-handling unit 202 and a local address and data-handling unit 203. The programmable registers and context logic 205 provides the ability to program the DMA 200 with a unique sets of parameters, that can be dynamically switched by providing the appropriate context identification (id). These parameters include source and destination addresses along with the address movement offset and direction on both the source and destination of data elements. Other control parameters, for example, the transfer size, transfer types for example, byte, half-word or word, are also stored in the programmable registers and context logic 205. Different sets of the above parameters are stored in the random access memory (RAM), and the user can select any appropriate set by providing the corresponding RAM address, i.e., the context id.

The local and external address and data-handling units provide multiple modes for address movement. These include an ability to provide positive or negative address movement, an address update facility and two different address movement algorithms for handling strides in two-dimensional arrays.

This document will illustrate the architectural innovations in the local address and data handling unit 203 and external address and data handling unit 202, that enables them to intelligently handle incoming data, store the data in a temporary location and then dispatch the data to its destination in an efficiently packed manner.

Figure 3:
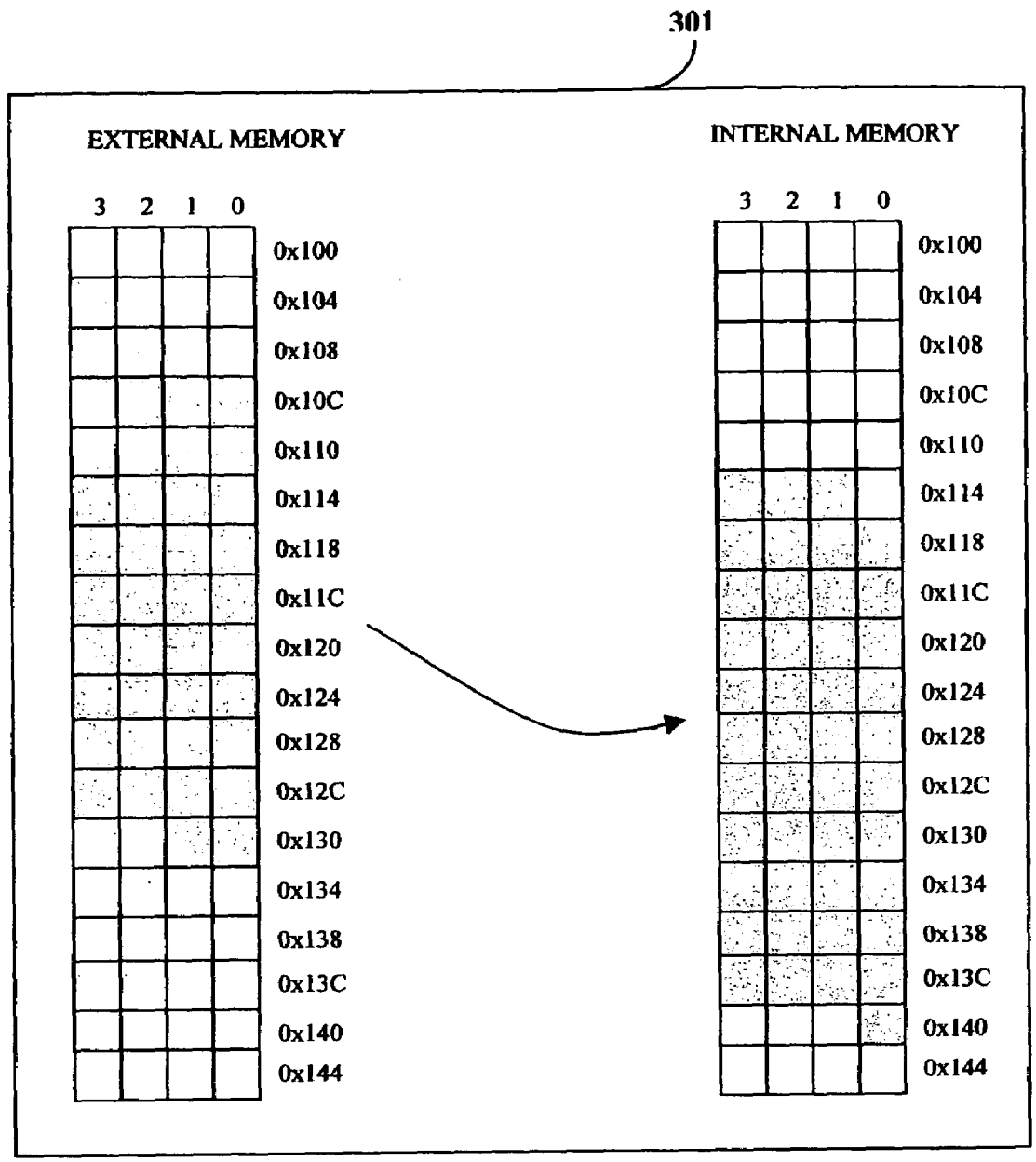
FIG. 3 illustrates a set of DMA transfers from the external memory to the internal memory.

FIG. 3 illustrates a set of DMA 200 transfers 301 from the external memory to the internal local memory, which is referred to as a READ operation. The transfer type is bytes (8-bit) and the number of elements transferred, i.e., the transfer size is 44. Thus, performing ordinary byte wide transfers would lead to a total of 44 transactions on the external bus. Furthermore, since some 32-bit external buses do not support bursts on byte and half-word transfers, the DMA 200 may receive very high transfer latencies per access. This situation is further aggravated in DRAM systems as such memories usually perform an order of magnitude better if the addresses are sequential.

The proposed architecture of the present invention will be able to identify that in transfers that satisfy the packing criteria, data can be packed together and four bytes can be fetched together by issuing a full-word transfer. Similarly, for half-words transfers, two half-words can be fetched by performing word wide transfers.

FIG. 4 illustrates the corresponding address movement per transfer when the data is fetched from the external memory in a packed fashion 401. As shown in FIG. 4, the first and the last set of two bytes are accessed individually whereas the accesses in middle fetch four bytes per access. Accordingly only 14 transfers are needed to complete the data movement. Furthermore, transfers 3 to 12 are sequential on a word-aligned boundary and hence may lead to faster burst accesses on the bus.

Depending on the transfer type, address offset and the address boundary, data may or may not be accessed in a packed fashion. The necessary criteria for data packing are described below.

FIG. 5 illustrates the valid byte enable patterns for both the internal and external sides 501. For the source and destination side, accesses are packed only if the address offset is minimum for that particular transfer type. For both the source and destination side, packing occurs only if the generated byte enable strobes fall within the tabulation 501 shown in FIG. 5. Thus packed byte transfers are allowed only if all the byte lanes contain valid data and the access can be performed as a word transfer. Packing of bytes into half-words is not allowed.

In addition to the above two constraints, the destination side has an additional constraint that the data packed be available from two consecutive accesses on the source side. For any given transfer, data is accessed in a packed fashion only if the outstanding transfers remaining are more than 4 for byte transfers and 2 for half-word transfers. This ensures that the transfer size boundary is not crossed. This constraint also holds for stride mode where the data packing is halted near stride boundaries. There is no constraint on the offset direction and a combination of positive or negative offsets can be used.

FIG. 6 illustrates the transfer of data when both the addresses are not aligned to the same grid boundary 601, 602 and 603. In this case, when data packing takes place in the destination (internal) unit, each destination word is formed out of two different words of the source data. Thus, for example the first packed destination word is formed out of the single byte accessed at source address A2 and the first 3 bytes of the source word at address A3. This scheme allows for data packing on the destination side if the destination word can be composed from up to two consecutive source accesses only. Single byte or half-word accesses are performed if more than two source accesses are required to form the destination word.

Offset direction affects the data-packing scheme. The destination word (32-bits) is formed by picking up the valid bytes/half-words from two consecutive source data words. Depending on the direction of the internal and external offsets, up-to four different schemes for data concatenation can be derived. The four combinations are: positive external offset and positive internal offset, positive external offset and negative internal offset, negative external offset and positive internal offset, negative external offset and negative internal offset. Each of the above combinations is illustrated below.

Figure 7:
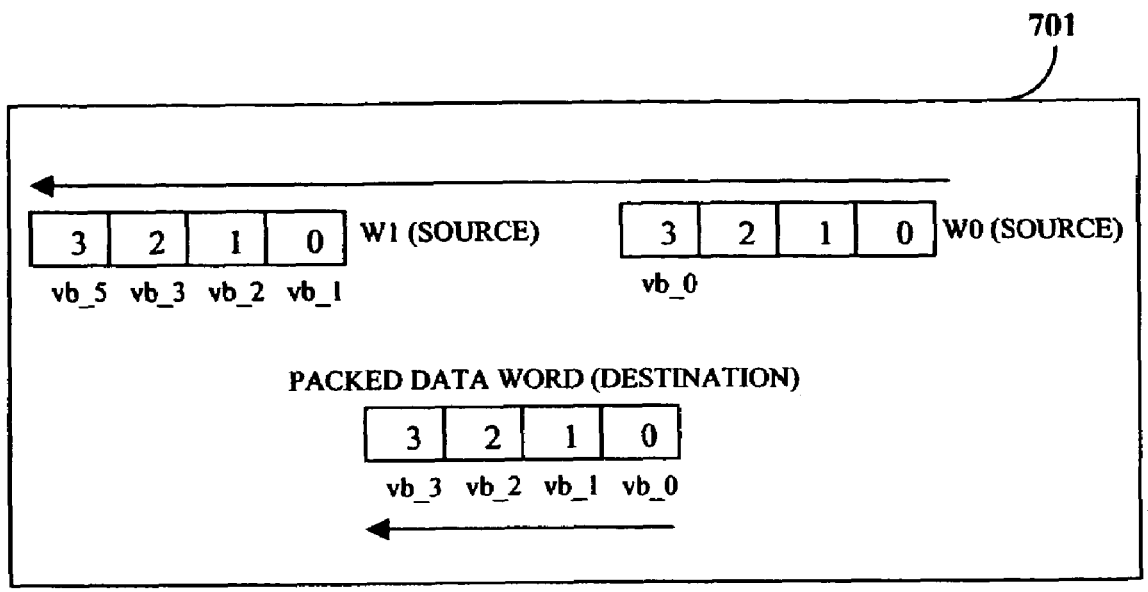
FIG. 7 illustrates the destination word formed out of two source words, for positive external and positive internal offsets.

A "positive external offset and positive internal offset" is the most common case and the process of such a transfer is illustrated in FIG. 7. To form the destination word, both the source words are scanned one after another for valid bytes starting from the least significant byte (LSB) of word 0, i.e., scanned from the right to left direction. The first four valid bytes are then assigned to the destination word again in the right to left format. Thus byte-0 of the destination word is formed from the first valid source byte illustrated as vb_0 in FIG. 7. Similarly, the next destination byte is formed from the second valid byte and so forth as shown in 701.

Figure 8:
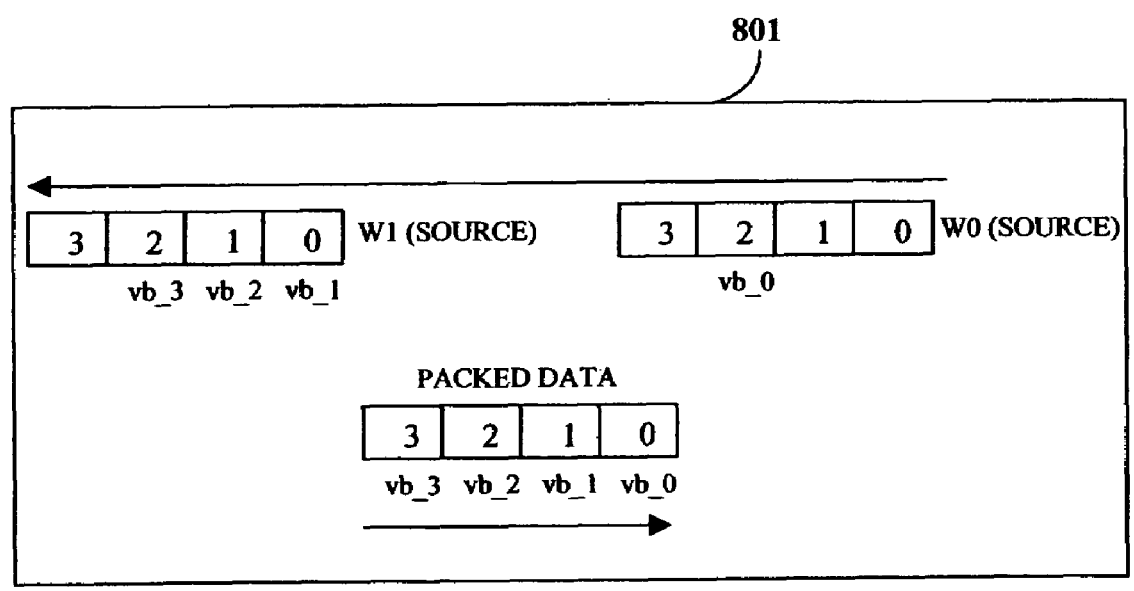
FIG. 8 illustrates the destination word formed from two source words, for a positive external offset and negative internal offset.

For a positive external offset and negative internal offset of the source words as shown in FIG. 8, the first four valid bytes are scanned from the least significant byte (LSB) to the most significant byte (MSB), from the right to the left direction. Since the internal offset is negative, the actual destination word is formed by assigning the pre-identified valid bytes to the destination word starting from the MSB in a left to right direction. Thus, byte-3 of the destination word is formed from the first source valid byte, byte-2 from the second and so on forth as shown in 801.

Figure 9:
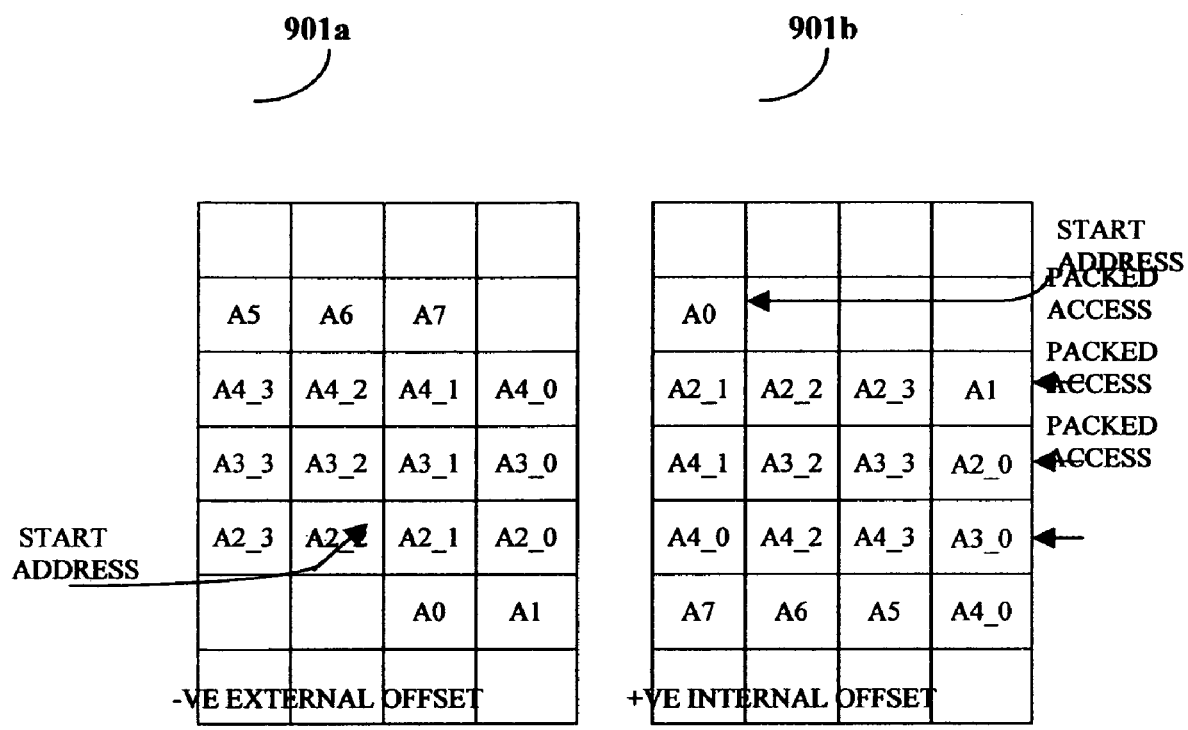
FIG. 9 illustrates the destination word formation when the external offset has a negative sign but the internal offset is incrementing positively.

FIG. 9 illustrates an example wherein the external offset has a negative sign but the internal offset is positively incrementing. As shown in diagram 901a and 901b, the first packed data word consists of one byte from the source access address A1 and three bytes from the source address A2 arranged in reverse order (A2_3,A2_2,A2_1).

Figure 10:
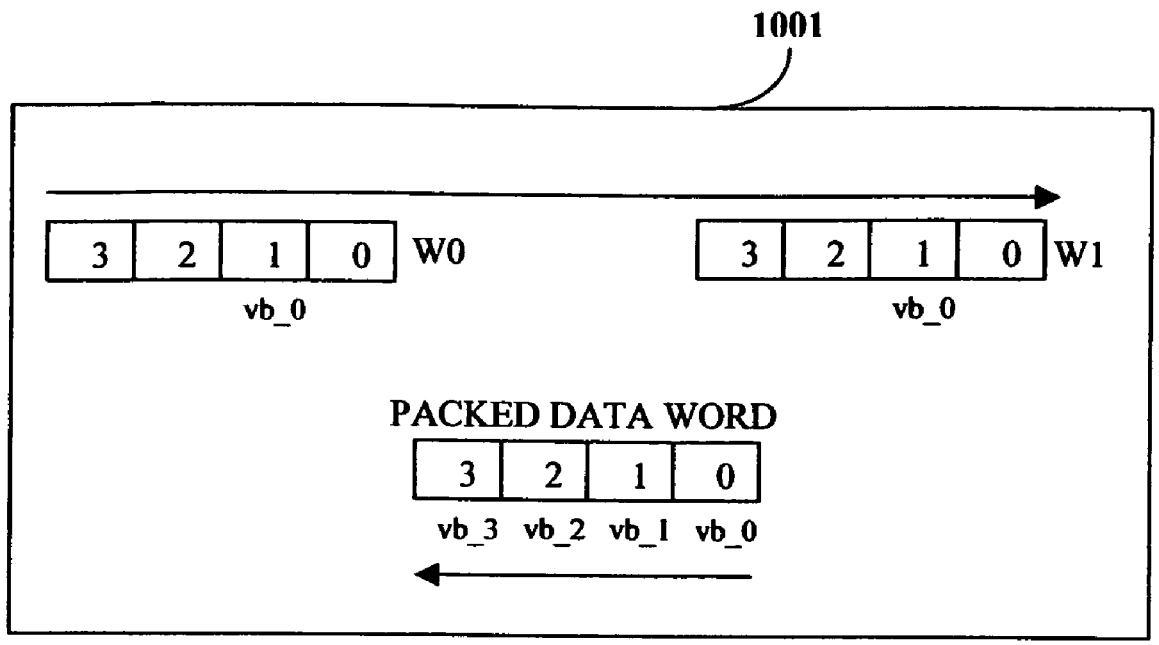
FIG. 10 illustrates data word formed from two source words, for a negative external offset and positive internal offset.

FIG. 10 illustrates data word formation for a negative external offset and a positive internal offset 1001. The valid bytes are identified by sampling W0 and then W1 in a MSB to LSB direction, in a left to right direction. The identified valid bytes are then assigned to the destination word in a LSB to MSB fashion, in a right to left direction.

Figure 11:
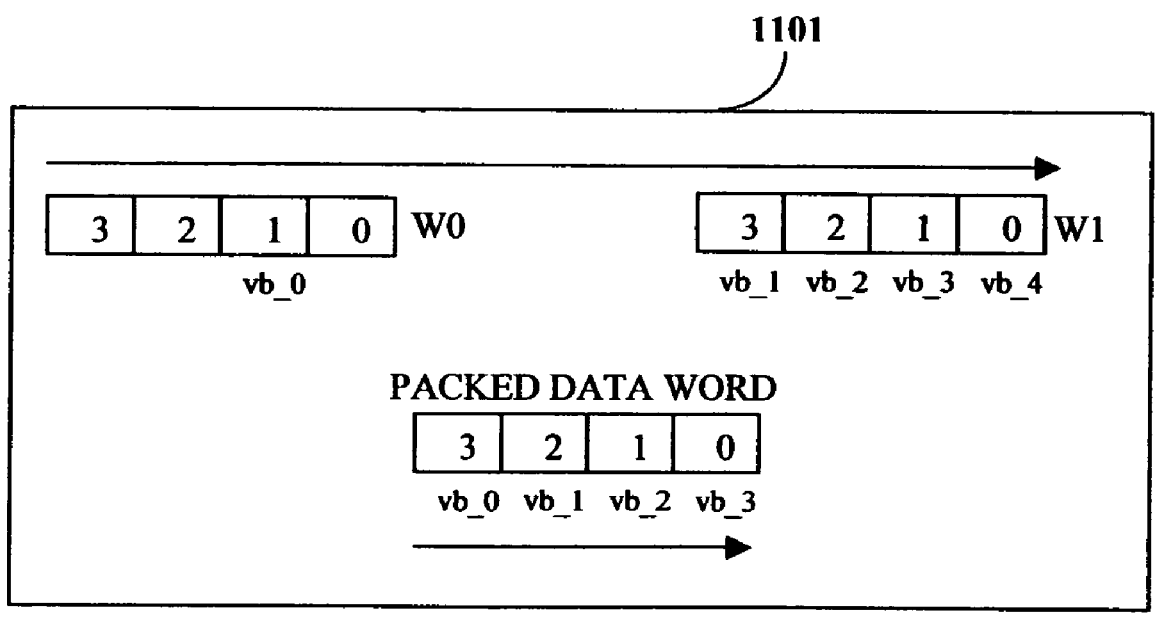
FIG. 11 illustrates destination word formed from two source words, for a negative external offset and negative internal offset.

For a negative external offset and negative internal offset, the valid bytes are identified by sampling W0 and W1. FIG. 11 illustrates destination word formation for the case of a negative external offset and negative internal offset 1101. In this example, the valid bytes are identified in a right to left direction and assigned in a right to left direction.

As shown in FIG. 2, the external 202 and internal 203 addresses or data are handled by two separate units. Furthermore, the external bus interface unit 201 implementation in the architecture illustrated in FIG. 2, de-links the address and data control circuitry. Thus a separate acknowledge response is received for the address and data on the READ path. This was done after giving due consideration to high-speed bus protocols where this de-linking is common.

The architecture of the external addressing engine (EAGU) and the local address generation unit (LAGU) is described below. Wherever possible, justifications are provided for architectural decisions.

Figure 12:
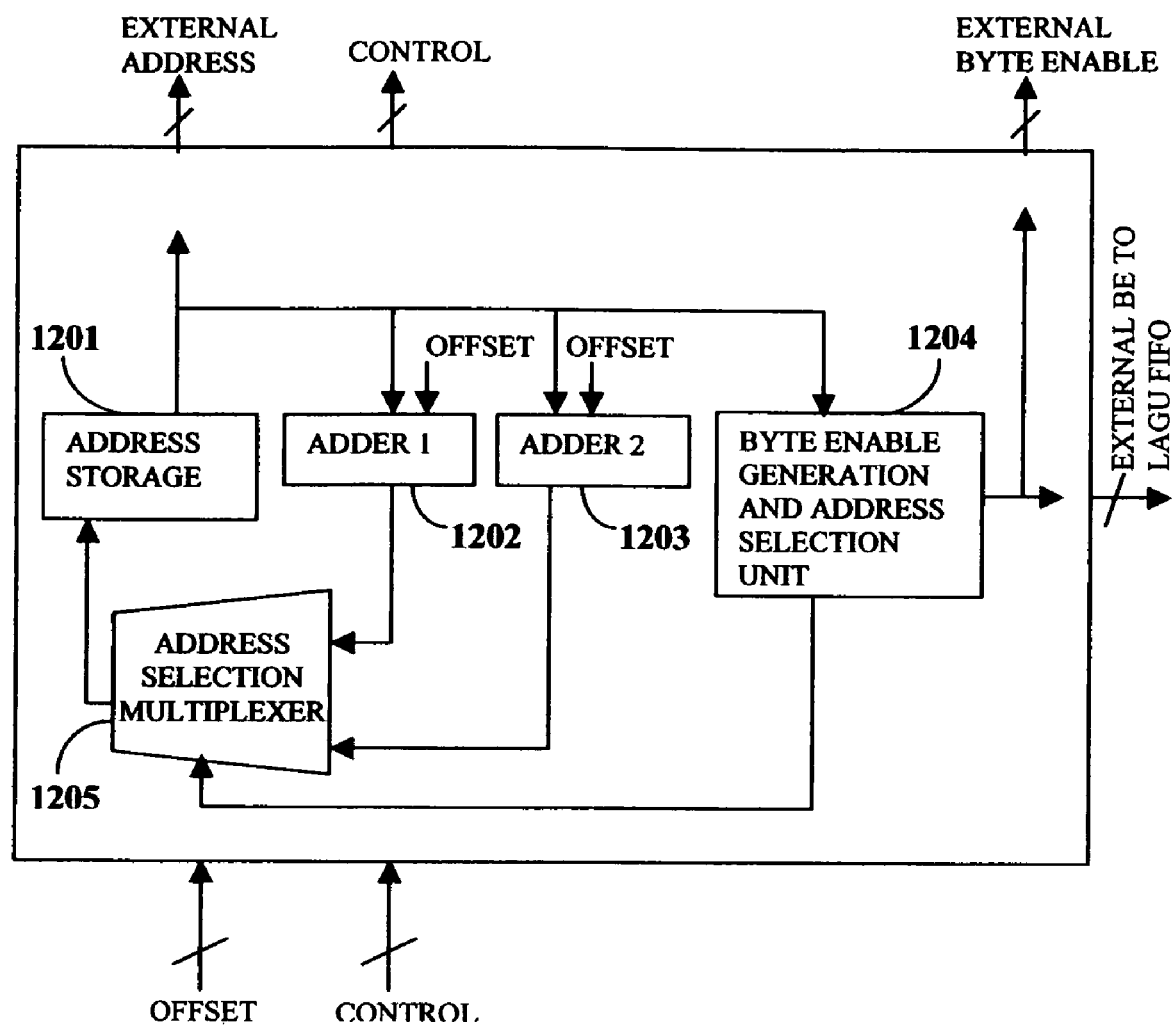
FIG. 12 illustrates the architecture of the external address generation unit (EAGU).

FIG. 12 illustrates the architecture of EAGU. For READ transfers, the EAGU generates the external memory addresses and the corresponding byte-enables. The EAGU also handles of outstanding requests and halts whenever a maximum of four outstanding requests have been issued.

The EAGU architecture consists of an address storage register 1201, two 32-bit adders 1202, 1203, a byte-enable generation and address selection unit 1204 and other control circuitry. At the start of operation, the first address to be accessed is stored in the address storage register 1201. In subsequent cycles, this register is updated by the output of either one of the adders, which add an offset to the address storage register 1201 contents. The output of adder-2 1203 is computed by adding the external offset stored in the context unit, whereas the output of adder-1 1202 is derived by adding or subtracting 4 from the address storage register 1201 depending on whether the context offset is positive or negative. Thus effectively, adder-2 1203 provides the next address to be fetched when the data packing criteria is met, whereas adder-1 1202 provides the next address when the packing criteria is not met.

The decision as to which one of the two addresses to store is performed by the byte enable and address selection unit 1204. This unit checks whether all the criteria for performing a packed access is being met for the current transfer or not, and publishes a select signal which acts as the input to the address selection multiplexer 1205. The address selection multiplexer chooses between the output of adder-1 1202 or adder-2 1203 depending on the value of select signal provided by the byte enable generation and address selection unit 1204. The address selection unit only provides the select signal and the multiplexer uses the select signal to perform the actual selection. Since the combinational delay across byte enable and address selection unit 1204 is large, it also justifies the use of two adders instead of one. The use of two adders allows the actual addition process to proceed in parallel with the criteria checking and hence the combinational delay of the adder is removed from the critical path. The byte enable and address selection unit 1204 is described in more detail below.

The byte enable pattern is determined by the byte enable generation and address selection unit 1204. The byte-enable pattern generated for any access depends on the following: the last two LSB bits of the address, the transfer-type, and whether the data packing criteria is satisfied or not.

FIG. 13 illustrates the byte-enable pattern generation logic and summarizes the conditions for data packing and the corresponding byte-enable strobes for different transfer types. The Xs in the table 1301 indicate "do not care" conditions. If the packing criteria are met, then the output of adder-2 1203 is stored in the register; if the packing criteria are not met then the output of adder-1 1202 is stored in the register.

One of the conditions for data packing is the pending transfer size. If this is less than four for byte transfers, or two for half-word transfers, only single unpacked accesses are performed. This condition has been set up to ensure that the transfer size boundary is not crossed. In the event of stride mode, the same condition is applied on a stride boundary by defining the pending transfers size as the minimum of the total transfer size and the stride size.

Figure 14:
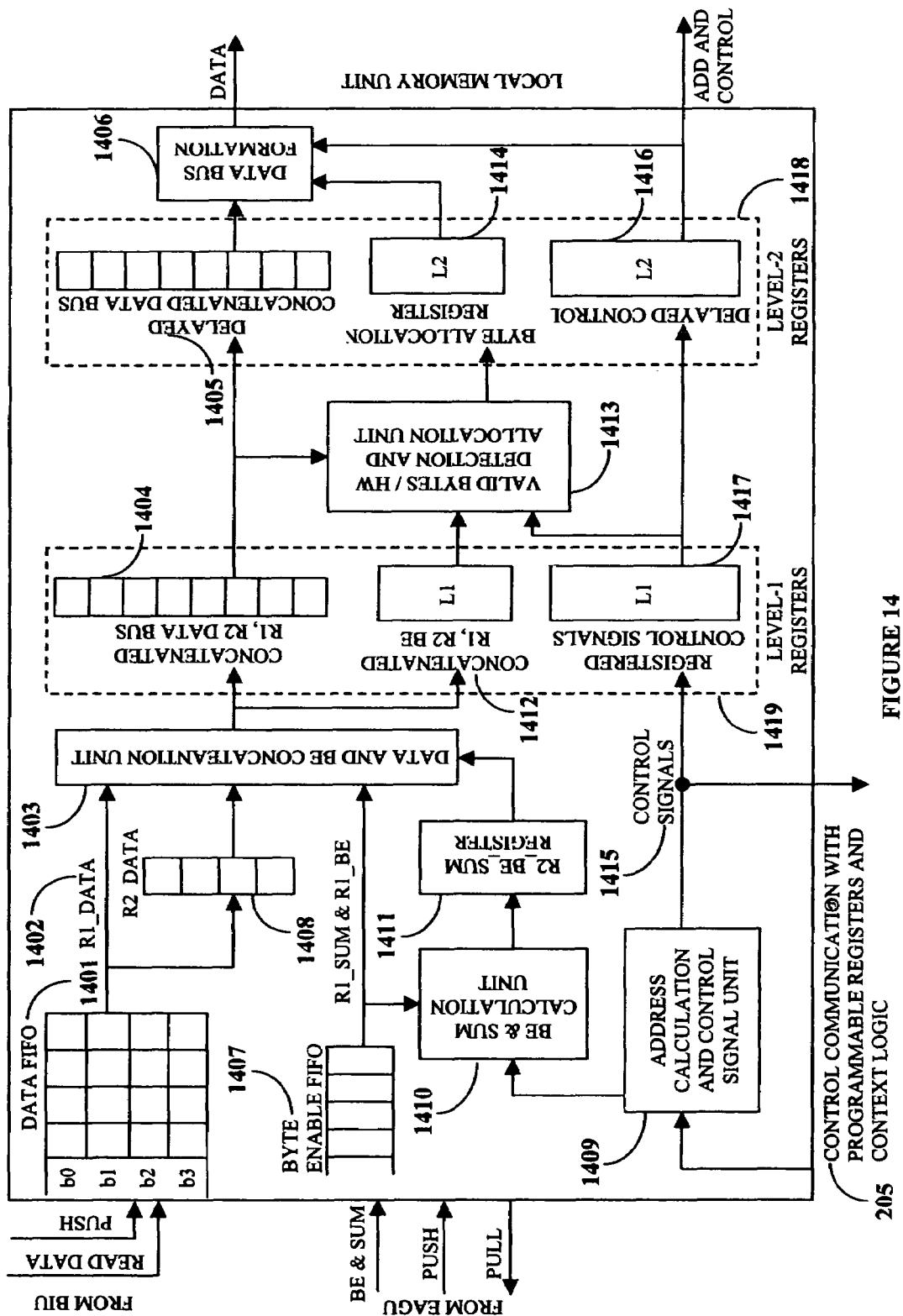
FIG. 14 illustrates the architecture of the read local address generation unit (RLAGU).

FIG. 14 illustrates the architecture of the local address generation and data-handling unit for READ transfers. The bus interface unit (BIU) provides a de-linked response for the address and data phase of any READ transfer. Thus, the data acknowledge may come a few cycles after the address acknowledge has been published. The DMA's address and data engines have been designed with this aspect in mind and have an in-built stalling mechanism to handle outstanding requests.

The sub-components of RLAGU are described below. First-in-first-out (FIFO) input stages: As described above, because of the nature of the control and data acknowledgements form the BIU, the data response may come a few cycles later than the address response. This necessitates the requirement for FIFOs 1401, 1407 on the input side of the RLAGU. The byte-enable pattern generated in the EAGU for every access is pushed into the byte-enable FIFO 1407 of the RLAGU on every address acknowledgement from the BIU. Storing this byte-enable pattern is necessary to determine the valid bytes from any data response. This FIFO 1407 also stores the sum of valid bytes in a given response data word. This is done to shift the adder from the read-data to the write-data path of the FIFO 1407 and achieve better timing.

Taking into account the latency of the BIU's response side, a minimum depth of four is required to obtain a smooth data and control flow. Thus a four deep FIFO 1407 is used for storing the byte-enable patterns and their sum. This FIFO also provides the logic necessary for supporting outstanding requests. The FIFO publishes a full signal to the EAGU, which is asserted whenever the FIFO depth has been reached and prompts the EAGU to stop forwarding further requests on the external bus. This is necessary in this case, as a response data element may require up-to four accesses on the local memory unit side. A four deep data FIFO 1401, which is 32-bit wide, is also entered in the input stage to store the data from such outstanding requests. To ensure that no data overflow takes place, the depth of the data FIFO 1401 is maintained equal to that of the byte enable (BE) FIFO 1407.

Intermediate Storage (R2_data): The architecture requires two response data words to be accessible in any given cycle. To facilitate this, the output of the Data FIFO 1401 is stored in an intermediate register R2_data every time a "pop" occurs on the FIFO. The 32-bit destination word can then be formed by selecting the valid bytes from those available in these two response data words. The 'BE' and 'Sum' from the BE FIFO is also stored in a temporary register (R2_BE_Sum 1411) to indicate which bytes are valid in the R2 register 1408. The contents of this register are modified every time there is a "pop" (on the Data FIFO 1401) or a write strobe is generated.

The R2 BE and Sum calculation unit 1410 is responsible for populating the R2_BE_Sum register 1411. If a pop occurs on the FIFOs but no write-strobe is generated, then the contents of R2_BE_sum register 1411 are updated with the READ-data bus of BE FIFO 1407.

While constructing the destination word, valid data bytes are picked up first from R2 1408 and then from R1 data 1402 (the FIFO output). Depending on the sign of the external offset the direction from which bytes are picked may vary (either LSB to MSB or vice-versa) but the R2_data 1408 is always sampled before R1 1402. Thus, where both "pop" and write-strobe are generated, the constructed destination word has used up all valid bytes in R2_data 1408 and none or some valid bytes from R1 data 1402. In the next clock cycle, a byte enable (BE) pattern and sum reflecting these remaining bytes is stored in R2_BE_sum register 1411.

Figure 15:
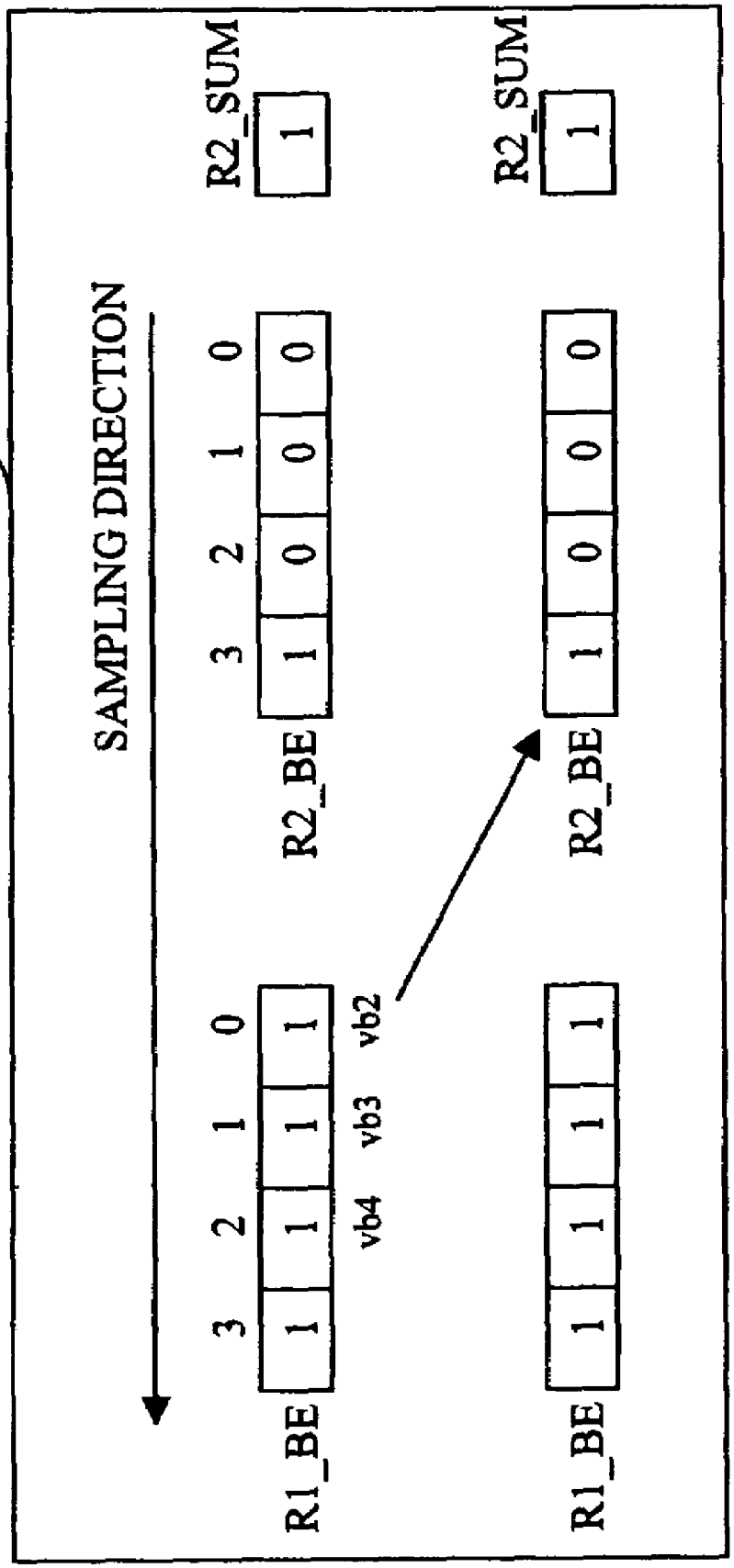
FIG. 15 illustrates the R2 population for pop and write-strobe='1'.

FIG. 15 shows an example of this process 1501. Initially, R2_data 1408 contains one valid byte, whereas R1_data 1402 contains 4 valid bytes. The destination word is then formed using one byte from R2 (vb1) and 3 bytes from R1 (vb2, vb3, vb4). The new value of R2_BE register now contains the byte pattern reflecting the one remaining byte from R1 whereas the new value of R1 is the next element in the FIFO.

A similar process is followed when pop=0 and write-strobe=1, with the only difference in the process being that the destination word and thus the new value of R2_BE is formed from the existing R2_BE contents. Thus the R1_data bus does not contribute to the data bus formation. This is most likely to happen when no data packing takes place and the destination bus consists of only one single valid byte or half-word. If the R2 1408 register has more than one valid byte, it may require multiple access to completely empty out R2 1408. When both "pop" and write-strobe are unasserted, i.e., 0, the contents of the R2_BE_sum register 1411 remain unchanged.

The address and control generation unit 1409 is responsible for generating the internal address to be placed on the local memory unit. This module also generates the control signals 1415 including "pop" (for the FIFOs), write-strobe, transfer count decrement as well as the byte-enable pattern for the local memory unit (LMU).

The address and BE pattern generation logic of the address and control generation unit 1409 is similar to that in the EAGU with a few modifications. In the EAGU, the current address to be accessed is previously stored and is used to calculate the BE pattern as well as the next address. In the RLAGU, the previously accessed address is first fetched on receipt of a response from the bus interface unit (BIU) and then the offset is added to get the current address. The BE and data packing algorithm then works on this calculated address and the result of this algorithm determines the next address to be stored back in the context unit.

The response from the BIU criteria for packed writes and the BE pattern generation in the RLAGU is similar to the criteria shown for EAGU in FIG. 12 with an additional requirement that the required number of bytes or half words must be present in R1 and R2 data buses combined together.

FIG. 16 illustrates the byte enable pattern generation, and the different possible scenarios that may occur 1601. Referring to FIG. 16, if the number of valid data bytes in R1 and R2 data buses is less than 4, then no data packing will occur. Similarly, for half-word transfers, if the number of valid half-words present in R1 and R2 is less than two, packing will not occur.

The transfer count decrement is 1 for unpacked accesses, and four or two for packed, byte or half-word accesses respectively.

A "pop" signal is generated every time all valid bytes from the register R2_data 1408 have been exhausted. Similarly, the write-strobe signal is asserted whenever data has to be dispatched to the LMU. The write-strobe signal updates the registers of the context unit and passes down two pipelined registers to finally emerge as the access request on the LMU side.

Data and BE Concatenation Unit: The two adjacent data words (R1 and R2) have to be arranged in different ways depending on the external offset direction. The concatenation unit 1403 arranges both the data bus as well as the byte-enable strobes of R1 and R2 and stores them in a 64-bit and 8-bit register respectively. If the direction of the external offset is positive then R1 is stored in the MSB bits and R2 in the LSB bits, but for negative external offsets, the order is reversed. This ensures that when valid bytes are being detected, R2 always get sampled before R1 and in the right order.

Stage-1 and stage-2 registers: In the architecture illustrated in FIG. 14, two pipeline stage registers are present. These are referred to as the stage-1 and stage-2 or level-1 or level-2 registers respectively. The level-1 1419 registers consist of the concatenated R1-R2 data bus 1404 and BE-strobes 1412 along with the storage for the address and control unit's output 1417. Level1 1419 registers also contain the sum of the BE-strobes. Level-2 1418 registers consist of the register delayed version of the concatenated R1-R2 data bus register 1405, a few of the control and address registers 1416 and byte-allocation registers 1414 storing the valid-byte or half-word information 1413 generated by the valid bytes/hw detection and allocation unit 1413.

The valid bytes or half-words detection and allocation unit 1413 samples the two data words (R1 and R2) and identifies the valid number of bytes or half words in them. The data words are sampled in accordance criteria for data packing and the positions of the first four valid bytes or the first two valid half words are identified. Since a maximum of 8-bytes or 4-halfwords may be present in total in the two words, a 3 -bit or 2 -bit value is required to represent their position for the bytes and half-words respectively.

Once the valid bytes or half-words have been identified, they are mapped to the byte lanes of the local memory unit (LMU) write data bus depending on the internal offset direction and the presence or absence of data packing. This mapping information is then stored in the byte allocation register and is used in the actual write data bus formation.

The architecture of this unit is optimised to take into account the limited combinations of internal byte-enable patterns that can be generated.

Figures 17, 18A, 18B:
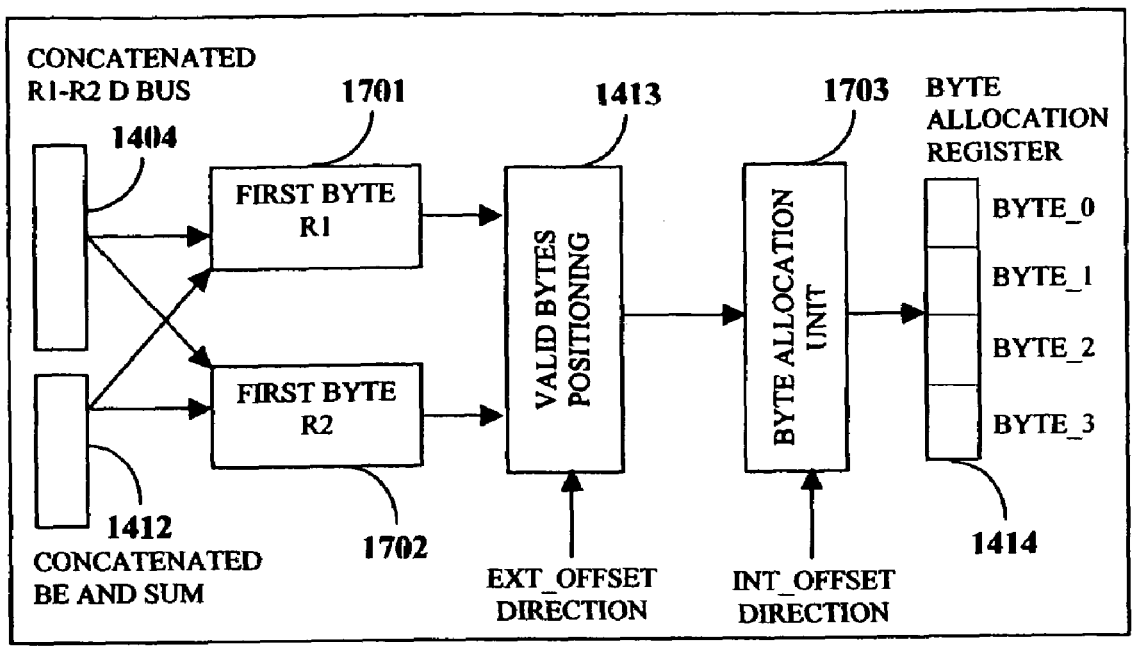
FIG. 17 illustrates the architecture of the valid bytes and half-word detection unit.
FIG. 18A and FIG. 18B illustrates the possible byte enable patterns for R1 and R2 for positive external offsets.

FIG. 17 illustrates the architecture of valid bytes or half-words detection and allocation unit 1413. The concatenated R1-R2 D Bus 1404 register contains the concatenated R1 and R2 words as arranged by concatenation unit 1403. Similarly, concatenated BE and Sum 1412 register stores the concatenated BE and Sum outputs of the concatenation unit 1403. The first_byte_r1 1701 and the first_byte_r2 1702 units detect the position of the first valid byte belonging to R1 and R2 words. The valid bytes positioning unit 1413 uses the output of first_byte_r1 1701 and first_byte_r2 1702 to detect the first four valid bytes out of the 8 bytes present in concatenated R1-R2 D Bus 1404. The byte allocation unit 1703 takes these four valid bytes and decides their assignment to the four destination byte lanes.

If no data packing takes place, then only a single byte is needed. If R2 contains any valid bytes then the first valid byte of R2 is used for this purpose, otherwise the first valid byte of R1 is used. Where data packing takes place, there have to be at-least four valid bytes in the concatenated R1-R2 register. Furthermore, the EAGU accesses dictate that R1 can contain either all 4 valid bytes or only a single valid byte. This constraint is not valid on R2 as the data from R2 can be evacuated one byte at a time, as in case of unpacked accesses.

FIG. 18A illustrates the possible BE patterns for R1 and R2 for positive external offsets 1801. The first four valid bytes can be selected from the eight bytes in the following manner. If R2_sum is four, i.e., R2 has four valid bytes then all the bytes are selected from R2. If R2_sum is three, then the three most significant bytes of R2 are selected along with one byte from R1, which is identified by the first_byte_r1 1701 block. For R2_sum=2, two MSBytes from R2 and two LSBytes from R1 are selected whereas for R2_sum=3, the first_byte_r2 1702 is selected along with the 3 LSBytes from R1.

Table 1802 in FIG. 18B illustrates this process for positive external offsets. A similar logic can be used for negative external offsets as well as the two different offset directions when dealing with half-word transfers.

Once the four valid byte-lanes out of the available eight have been identified, they have to be assigned to the byte-lanes of the write data bus. For unpacked accesses i.e., single byte or half-word, the valid bytes or half-words are replicated on all the other lanes. For packed accesses, depending on the direction of the internal offset, the byte allocation unit assigns one of the valid bytes to the write data byte lanes and stores this positioning data in a register. Thus, for example, if the internal offset is positive then the first valid byte ($vb\_0$) is assigned to the LSB lane of the data bus, $vb\_1$ is assigned to the next lane, etc. For negative internal offsets, the LSB lane of the data bus receives the last valid byte ($vb\_3$), the next one receives $vb\_2$, etc. Thus the order of assignment is reversed, i.e., LSB assigned to MSB, etc. for negative internal offset whereas it is preserved when the internal offset is positive. Four 3-bit registers are used to store this information, one register per byte lane of the write data bus. These are shown in FIG. 13 as the byte-allocation registers.

The data bus formation unit 1406 uses the information from the byte-allocation registers 1414 to form the actual write-data bus out of the 8 byte-lanes of the delayed concatenated R1-R2 registers 1405. This unit consists of four 8 to 1 multiplexers allowing any one of the eight-byte lanes to form one byte of the write data bus. The 3-bit position value stored in the byte-allocation register 1414 acts as the select input for each multiplexer.

Figure 19:
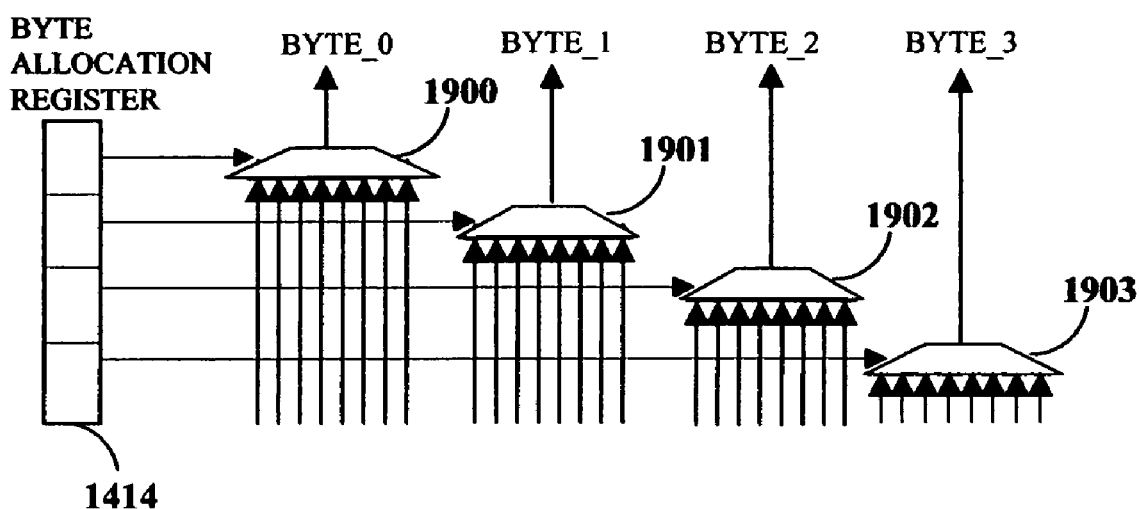
FIG. 19 illustrates a system comprising multiplexers and a byte allocation register.

The byte-allocation register 1414 has four such 3-bit positions stored, one for each byte lane of the data bus. This system comprising the multiplexers 1900, 1901, 1902, 1903 and the byte allocation register 1414 is shown in FIG. 19.

The architecture illustrated in this invention is designed such that for both READs and Writes, a common external addressing engine is used, whereas separate addressing engines are present on the internal side to accommodate the high READ latency of most popular DRAMs and the de-linked address and data response which is supported by many popular Bus standards. Thus, the DMA 200 could ideally pile up a few READ requests on the external bus and then move over to process the WRITE requests. When the data response of the piled up READ requests reaches the DMA, the presence of separate READ/WRITE addressing engines would allow it to process and dispatch the data to the LMU without stalling the WRITE pipe.

For processing the byte-enable and the associated data compaction a certain duality exists between the READ and the WRITE addressing engines. Thus the architectural component of the EAGU which handles Writes will reflect the RLAGU design, whereas the write local address generation unit (WLAGU) design will be similar to the EAGU architecture. Furthermore, the usage of external offset and internal offset will exchange places along with the target of source and destination. Given the above observation, a complete description of the WRITE side is redundant and is hence not provided in this document.

FIGS. 20, 21 and 22A, 22B illustrate an example of a byte-wide transfer from the external to the internal or local memory. The figures illustrate in a step-by-step fashion, the working of the byte-enable support logic.

By way of example, consider the following parameters associated with the transfer:

| | |
|---|---|
| Transfer Width | Bytes (8 -bit) |
| Transfer Size | 16 bytes |
| Source Direction | Positive |
| Destination Direction | Negative |
| Source Offset | +1 (minimum magnitude) |
| Destination Offset | −1 (minimum magnitude) |

Figure 20:
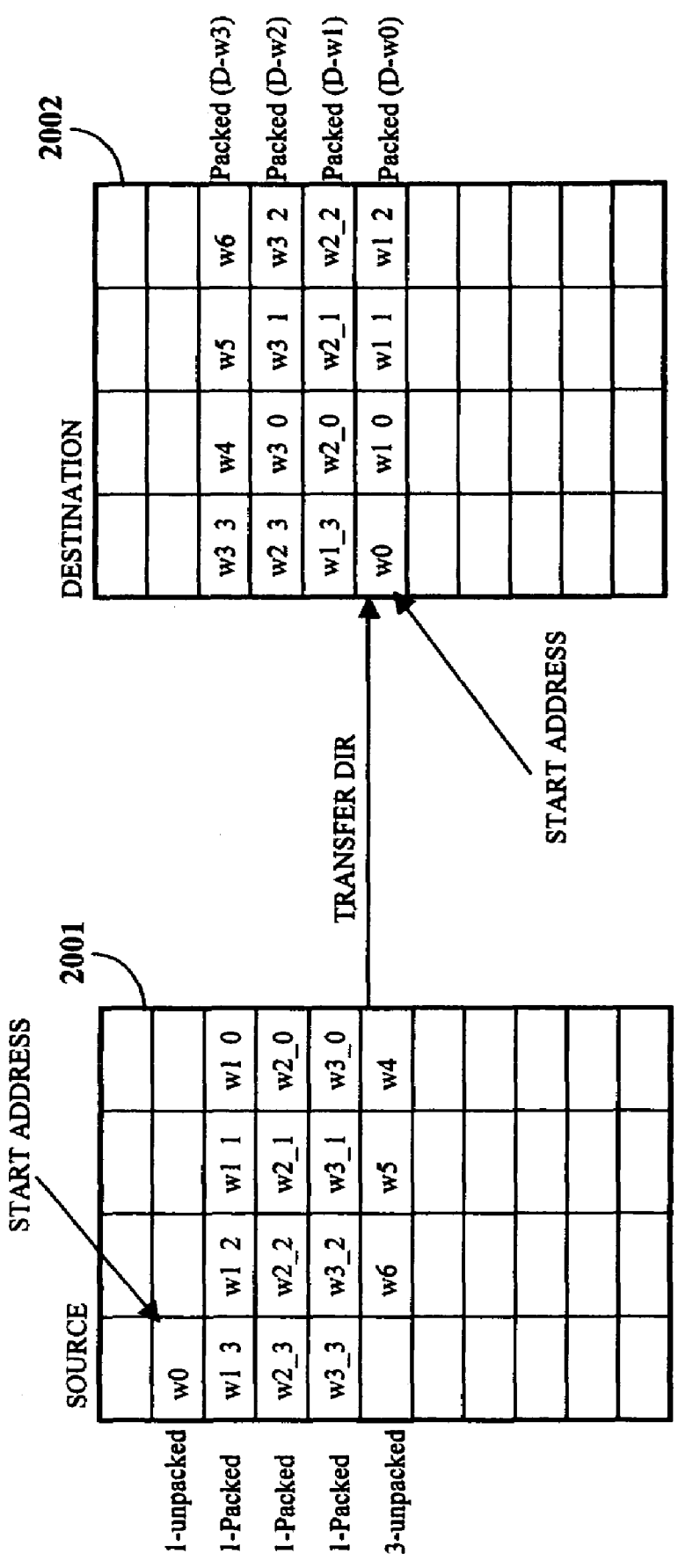
FIG. 20 illustrates an example wherein 16 bytes of data are transferred from the external memory to the internal memory.

FIG. 20 illustrates the data transfer of 16 bytes from the external memory to the internal memory 2001. The data on the source side is colour coded to indicate individual accesses. Further, a numbering scheme is provided to identify each data element. For packed accesses, the number after the underscore indicates the byte position in the concatenated data word. On the destination side, a numbering scheme is used to indicate which source data bytes are used to form the destination word 2002.

The source address movement direction is positive whereas the destination address movement direction is negative. This leads to the data pattern of FIG. 19 wherein the first accessed data element from the source appears to be the last data element of the destination.

FIG. 21 illustrates the data elements fetched per access from the source, and the data elements written per access to the destination. The source side has a single unpacked access i.e., byte wide transfer followed by three packed transfers and finally 3 unpacked accesses 2101a. The destination side has only four accesses performed in a packed fashion 2101b.

The criteria checking for data packing and the resultant data compaction on the source and destination sides occur independent of each other. Thus, it is possible to have unpacked accesses on one end while, at the same time have packed accesses on the other side. This is also seen in the current example wherein the source side consists of both packed and unpacked accesses, whereas the destination side has only packed transfers. This section further explores the criteria checking and data flow on each transfer side.

The external address generation unit (EAGU) generates the control signals for the source side for READ transfers. For the transaction shown in FIG. 20 and FIG. 21, the first transfer does not meet the criteria for data packing as the last two bits of the address are not aligned on a word boundary (Address [1:0]=11) and the offset direction is positive. The subsequent transfers satisfy all the criteria, leading to a burst of packed accesses. After 12 bytes are accessed in a packed fashion (using 3 word transfers) the remaining 3 bytes have to be accessed as single byte transfers because they do not meet the criteria that the remaining transfer size should be more than or equal to 4. Performing a packed access for these three bytes will also not generate a valid byte mask pattern as described in FIG. 4 of the byte_enable_support document. The conditions presented above lead to a data access pattern as shown in FIG. 2 for the source side with a few unpacked accesses and the remaining as data-compacted pattern.

The first data flows into the receiving FIFO. The data which exits the FIFO is stored in another temporary register (R2) and the FIFO output (R1) and R2 collectively provide the two consecutive source data elements from which the destination word should be formed.

Figure 1:
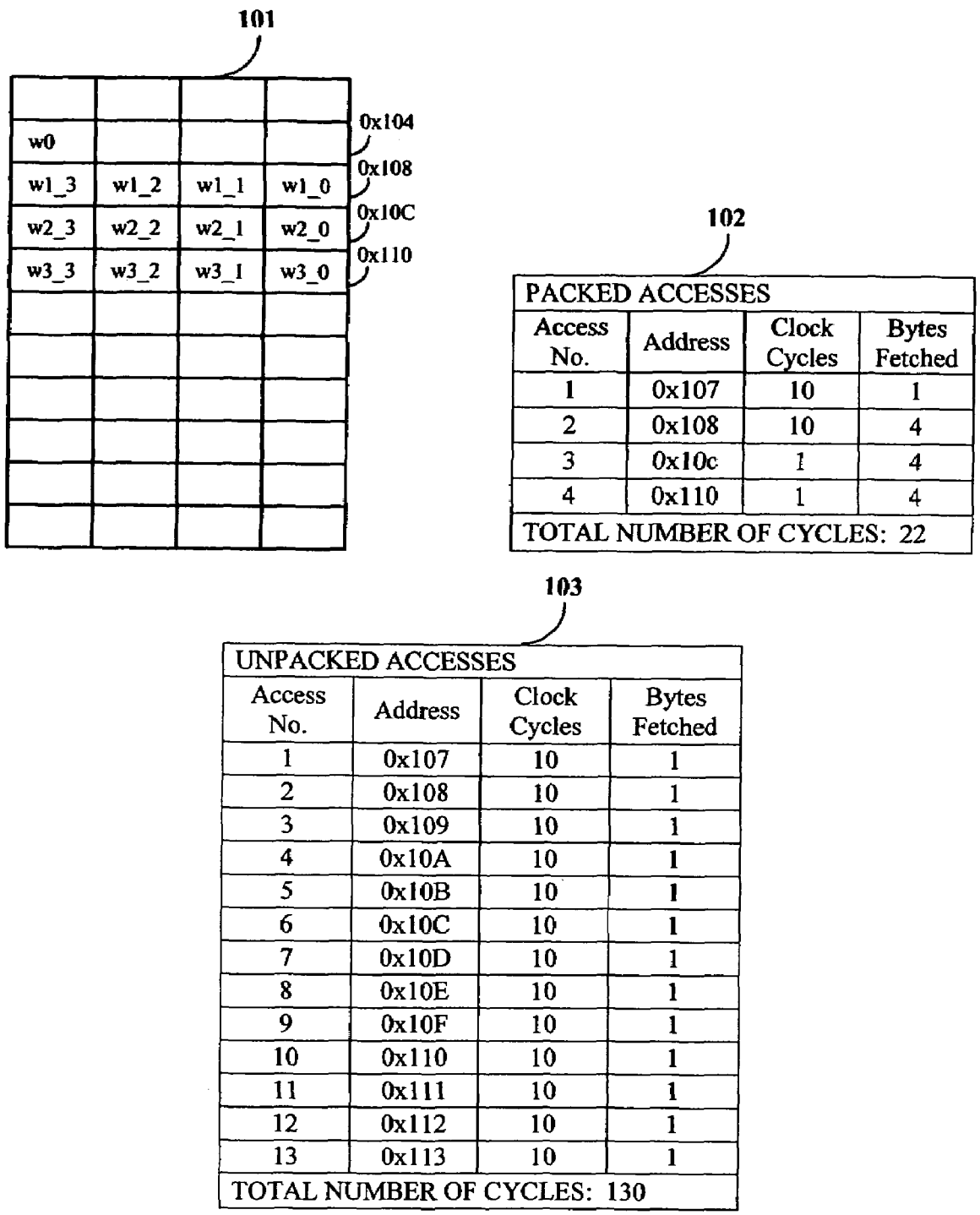
FIG. 1 illustrates a memory access of thirteen bytes.
Figure 22:
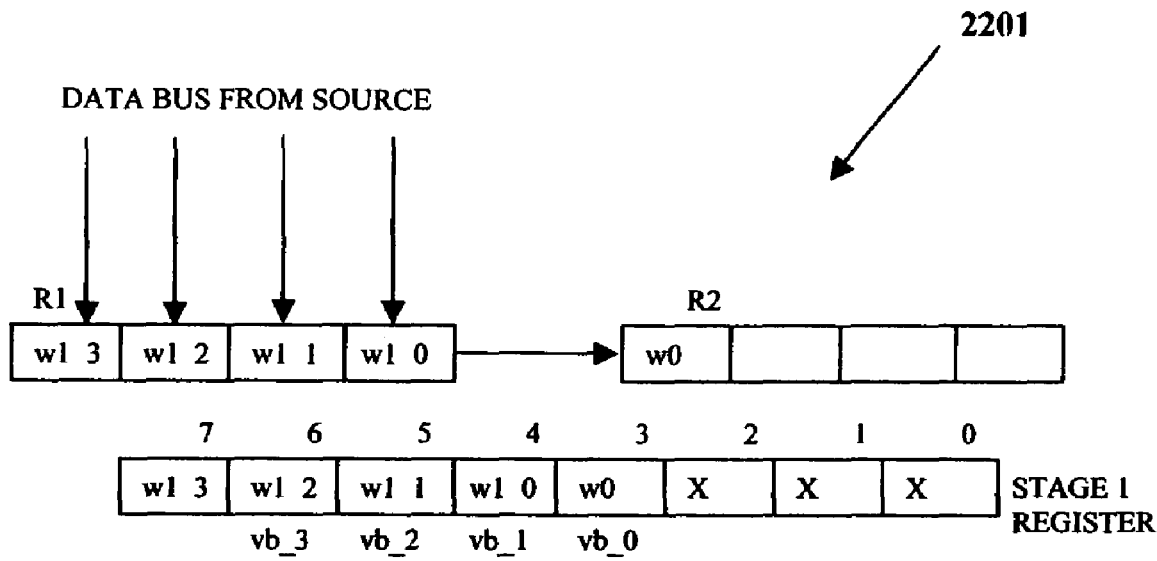
FIG. 22A and FIG. 22B exemplifies the data bus formation process.
Figure 22:
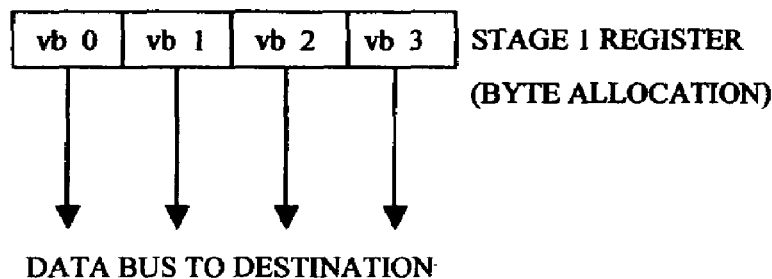
Figure 22:
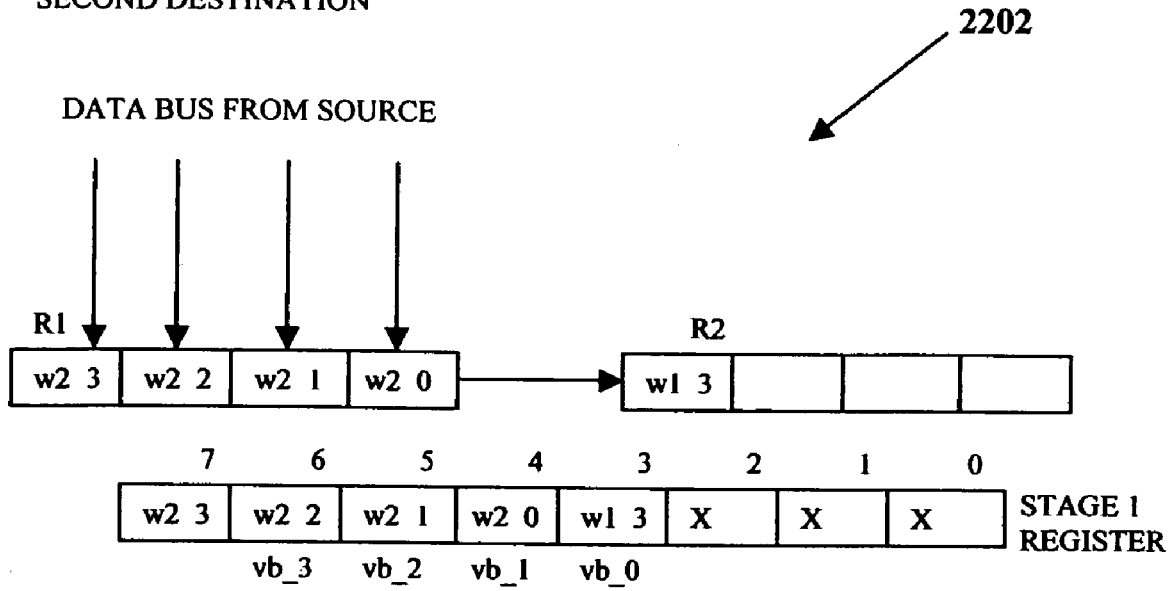
Figure 22:
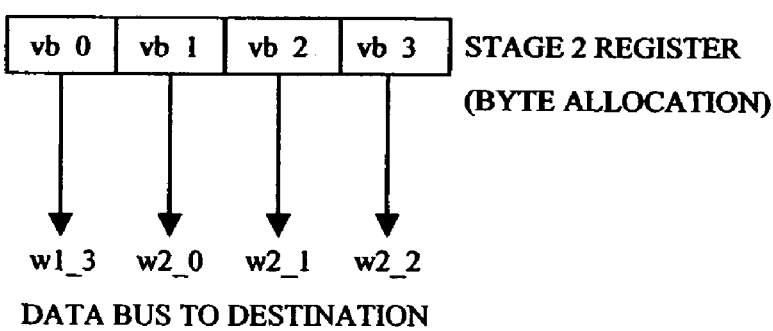

In the example illustrated in FIG. 20, all the accesses on the destination end meet the criteria for a packed access as described in FIG. 15. The offset is −1, the LSB address bits have a value of 11 and the pending transfers are more than four. When the first data element (w0, a single byte) enters the FIFO, the sum of data elements present in R1 and R2 is less than four. The control unit thus stores this element in the temporary register R2 and waits for the next data element to enter the FIFO. Since the next element is a packed word consisting of four bytes, when it enters the FIFO the sum of bytes exceeds four and the control logic proceeds with building the packed destination word. This situation is illustrated in FIG. 22A. R1 contains a packed data word whereas R2 contains only a single byte on the MSB lane. Since the external offset is positive the concatenated (8 byte wide) stage one register is formed by putting R2 on the LSB four bytes and R1 on the MSB four bytes. The concatenated register is labelled as the Stage-1 Register in FIG. 3. Once the stage-1 register gets populated, the valid byte or halfword detection unit starts processing. Since the external addressing movement was positive, the byte detection happens from a right to left (LSB to MSB) direction. Thus the first valid byte in R2 is identified at position 3, and the first valid byte in R1 is identified at position 4. Since R2 contains only one byte (r2_sum=1), using the table shown in FIG. 17*b* (byte_enable_support-.doc), the position of the other valid bytes is identified (vb_0, vb_1,vb_2,vb_3) in FIG. 3A. After the valid bytes have been identified, they are allocated to the byte lanes of the destination bus. Since the internal offset movement is negative, the byte allocation proceeds in reverse manner. Thus the LSB source byte is routed to the MSB destination byte and so on. This leads to the byte allocation arrangement shown in FIG. 22A 2201. Since a common nomenclature has been followed in FIGS. 20, 21 and 22, this section clearly demonstrates how the accesses depicted in FIG. 1 are obtained.

FIG. 22B shows the next destination access 2202. In the first access 3 out of 4 bytes of R1 had been consumed. Thus, when this data moves out of the FIFO into the temporary storage register (R2), only the MSB byte is considered valid. Once the new data (w2) enters the FIFO, the destination word is again formed using one byte from R2 (w1_3) and three from R1 (w2_0,w2_1,w2_2). The data formation process is akin to the one described above.

We claim:

1. A method of reducing data transfer overheads in a 32-bit direct memory access architecture, comprising the steps of:
   identifying optimal number of data elements, that can be accessed as a single full-word transfer;
   setting data packing criteria;
   analyzing data pattern and determining impact of offset direction on data packing;
   compacting data and fetching four bytes or two half-words in one transaction by a full-word transfer instead of a partial transfer if the data packing criteria are met; and
   fetching a single byte or a single half word if the data packing criteria are not met.

2. The method of claim 1, wherein the step of setting data packing criteria comprises:
   packing source and destination side with the data elements if the address offset is minimum for that particular transfer type;
   allowing packed byte transfers if byte lanes contain valid data and the access is performed as a word transfer and further disallowing packing of bytes into half-words;
   allowing data packing if data is available from two consecutive accesses on the source side; and
   allowing data packing if outstanding transfers remaining are more than 4 for byte transfers and 2 for half-word transfers.

3. The method of claim 1, where in the step of determining the impact of offset direction on said data packing, comprises the steps of:
   determining if the offsets of the external and internal addresses is either positive or negative;
   if external offset is positive and the internal offset is positive,
     scanning both source words one after another for valid bytes starting from least significant byte in a right to left scan direction;
     assigning first four valid bytes to destination word starting from the least significant byte in a right to left direction;
   if the external offset is positive and the internal offset is negative,
     scanning both source words one after another for valid bytes starting from the least significant byte in a right to left scan direction;
     assigning the first four valid bytes to the destination word starting from most significant byte in a left to right direction;
   if the external offset is negative and internal offset is positive,
     scanning both source words one after another for valid bytes starting from the most significant byte in a left to right scan direction;
     assigning the first four valid bytes to the destination word starting from the least significant byte in a right to left direction;
   if the external offset is negative and internal offset is negative;
     scanning both source words one after another for valid bytes starting from the most significant byte in a left to right scan direction; and
     assigning the first four valid bytes to the destination word starting from the most significant byte in a left to right direction.

4. The method of claim 1, wherein the step of identifying the optimal number of data elements, that can be accessed as a single 32-bit full word transfer, comprises the steps of:
   determining transfer type and accessing four bytes if the transfer type is bytes and the data packing criteria is met;
   determining the transfer type and accessing two half words if the transfer type is half words and the data packing criteria is met; and
   determining the transfer type and accessing single byte or single half word if the data packing criteria is not met.

* * * * *